Feb. 3, 1970

R. E. ROTHFELDER 3,492,954

SYNCHRONOUS SOIL AMENDMENT AND PESTICIDE APPLICATOR
FOR PRECISION SEED PLANTING

Filed Oct. 11, 1966

INVENTOR
RAYMOND E. ROTHFELDER

BY Charles L. Harness

ATTORNEY

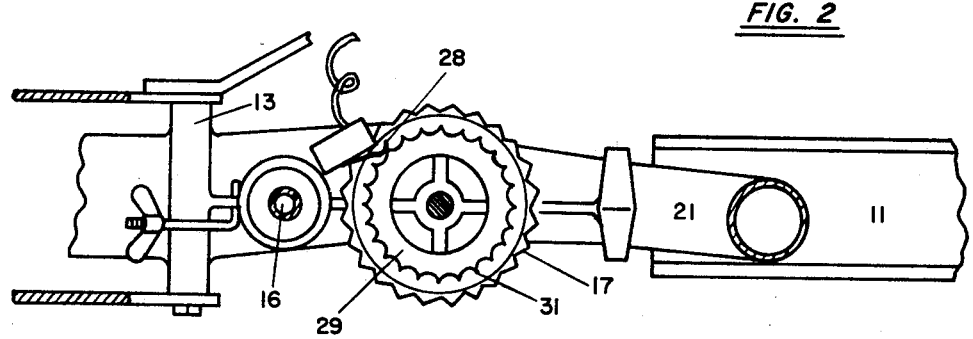
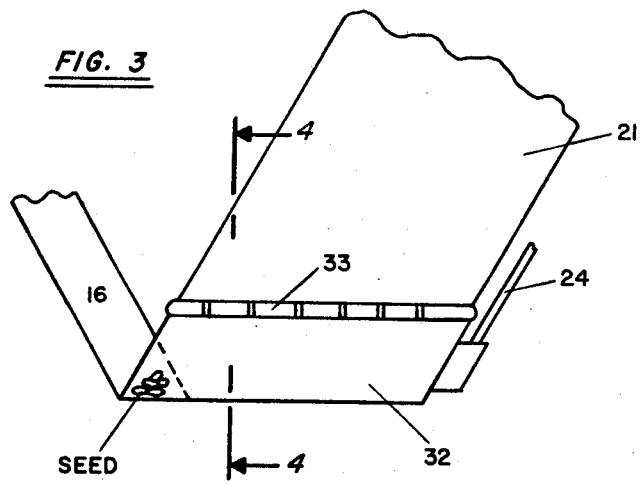
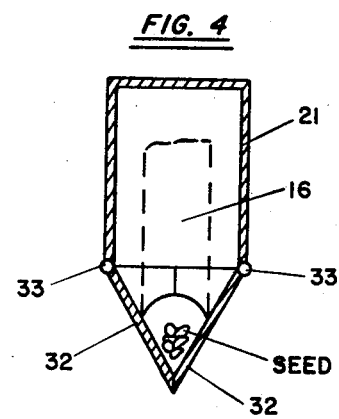

—INVENTOR
RAYMOND E. ROTHFELDER

United States Patent Office 3,492,954
Patented Feb. 3, 1970

3,492,954
SYNCHRONOUS SOIL AMENDMENT AND PESTICIDE APPLICATOR FOR PRECISION SEED PLANTING
Raymond E. Rothfelder, Fremont, Calif., assignor to W. R. Grace & Co., New York, N.Y., a corporation of Connecticut
Filed Oct. 11, 1966, Ser. No. 585,964
Int. Cl. A01c 5/08, 7/06
U.S. Cl. 111—51                    1 Claim

ABSTRACT OF THE DISCLOSURE

An apparatus for synchronously dropping a seed and a quantity of soil amendment material in which a seed is fed from a supply source to a valve located at a dispensing position and the soil amendment material is fed from a separate supply source to the dispensing position. The valve is periodically opened to drop the seed and the soil amendment material synchronously.

---

This invention relates to soil amendment and pesticide application devices for machine planted seeds. In one particular aspect it relates to a device which can be synchronized to drop soil amendments over the seed.

Precision or hill-drop type planters are designed to place a single seed or a group of seeds at predetermined intervals in the seed row. Where soil crusting has been a factor in proper seed emergence, amendments have been applied on top of the seed in a continuous band. This practice is not only economically wasteful, but when pesticides are used the problem of pesticide residues in the soil emerges.

It is therefore an object of this invention to proivde a device designed for attachment to precision or hill-drop type planters which is synchronized to drop soil amendments over those places where the seed has been dropped.

This and other objects of the invention will become apparent from the following detailed description and drawings wherein;

FIG. 2 is a sectional view on the line 2—2 in FIG. 1;

FIG. 3 is a detailed view of the amendment conduit of this invention;

FIG. 4 is a sectional view on the line 4—4 in FIG. 3;

This invention is particularly adaptable for use as a hilldrop mechanism for seed, particularly when applying soil amendments simultaneously with seed. Most precision hill-drop planters consist of two elements, the first of which is a cell plate or similar device for pulling a predetermined number of seeds out of a seed hopper and dropping them into a seed tube. The second element is a device at or near the bottom of the seed tube which collects the seed and drops them as a group into the soil. This invention can be used as the second element of a hill-drop planter.

This invention will be best understood from a detailed description of its use as the second element in a hill-drop planter.

Figure 1:
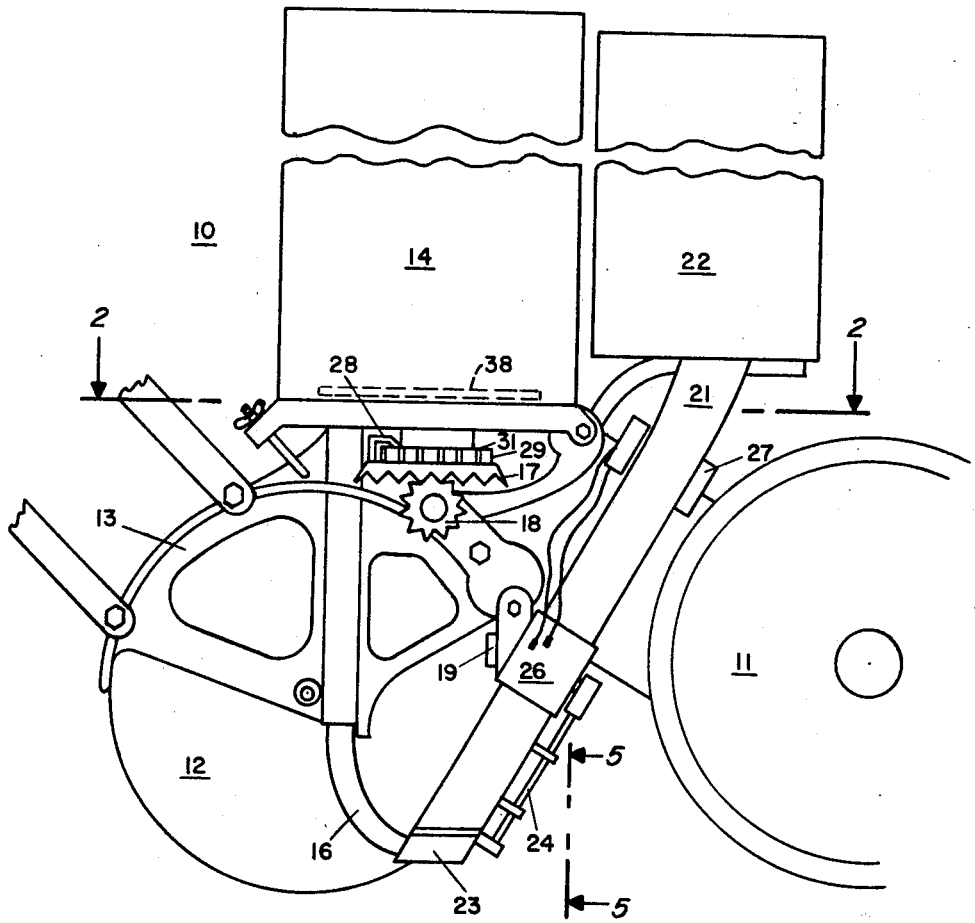
FIG. 1 is a right-hand side view of a precision seed planter incorporating the features of this invention.

Referring now to FIG. 1, there is depicted a seed planter generally at 10 having in combination a drive wheel 11, a disc opener 12, frame 13, seed hopper 14, seed tube 16, crown gear 17, and pinion gear 18. The synchronous amendment applicator of this invention is attached to frame 13 by suitable means such as a bolt at 19 and consists of conduit 21 communicating with and secured to an amendment container 22. The conduit 21 has at its discharge end (lower end) a valve 23 connected by rod 24 to a rotary solenoid 26. The solenoid 26 is connected to a circuit box 27 which is connected to a microswitch 28 is in communication with and is actuated by a cam 29. The cam 29 is mounted on the flat horizontal surface of the crown gear 17, and rotates at the same speed of the crown gear 17. Each lug 31 on the cam 29 corresponds to a cell in the seed plate and as the cam 29 rotates with the crown gear 17 the microswitch 28 actuated by the lugs 31 energizes the solenoid 26 causing the valve 23 to open.

As the precision planter described is towed along a plant row ground surface, the drive wheel 11 by a connection (not shown) rotates the pinion gear 18, which causes the crown gear 17 to revolve. The crown gear 17 rotates a seed plate 38 in the seed hopper 14 which feeds out one seed or a group of seeds, depending on the size of the cell in the plate. The seeds in seed hopper 14 are conducted via seed tube 16 into the amendment conduit 21. Seed tube 16 communicates with the amendment conduit 21 and extends into conduit 21 so as to deposit the seed upon the valve 23, where it is released along with the soil amendments when the valve 23 is opened.

Figure 5:
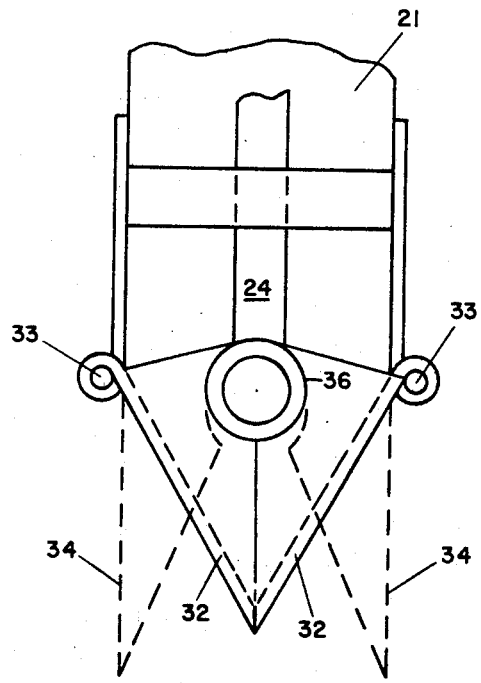
FIG. 5 is a view on the line 5—5 of FIG. 1.

Valve 23, as illustrated in FIG. 5, is a clam shell type valve and consists of plates 32 hinged at 33. The rod 24 is attached to the plates 32 by a pivot pin 36. When rod 24 is actuated by the solenoid 26 it moves downward and opens the twin shells of valve 32 to the position shown approximately by dotted line 34, thus allowing the seed and the soil amendment to drop to the ground. It is understood that valve 23 as illustrated and described is a preferred embodiment of this invention and other valve openings for conduit 21 may become readily apparent to one skilled in the art. For example, the valve 23 may consist of a single flat plate placed horizontally across the discharge end (lower end) of conduit 21.

The solenoid 26 may be mounted at any convenient place along conduit 21 so as not to interfere with any of the normal operations of the planter. The circuit box 27 may contain a spark arrester.

It will be readily understood by those skilled in the art that other linkages besides a solenoid linkage can be used to synchronize the placing of soil amendments over the seeds. Among these linkages are mechanical and hydraulic linkages.

The hill-drop planter illustrated in FIG. 1 is shown with one disc opener 12 removed to expose the seed tube 16. In use, the planter operates with twin discs 12 with the seed tube 16 between them.

The appartus of this invention can apply a wide variety of soil amendments in synchronization with the seed. These include fertilizers, mulches such as vermiculite, pesticides, biocides and the like. The apparatus of this invention is especially useful in depositing pesticides with the seed for protection against diseases and insects. Because the pesticides can be delivered precisely where it will do the most good, in the immediate vicinity of the seed, the total amount of pesticide used per acre is less that that which is applied by conventional continuous band application. Not only is the cost of the pesticide application reduced, but also the problem of pesticide residue in the soil is lessened.

While the apparatus herein disclosed and described constitutes a preferred form of the invention, it is also to be understood that the apparatus is capable of mechanical alteration without departing from the spirit of the invention and that such mechanical arrangement and commercial application as fall within the scope of the invention are intended to be included herein.

What is claimed is:

1. In a soil amendment apparatus for a seed planter having a frame, drive wheel, soil breaking means, seed container, seed conduit, means for dispersing a measured quantity of seed at predetermined intervals, said seed dispensing means actuated by said drive wheel, the improvement which comprises a soil amendment container mounted on said frame,
a soil amendment conduit mounted on said frame,
the upper end of said soil amendment conduit mounted on said frame,
the upper end of said soil amendment conduit communicating with and secured to said amendment container,
a valve means secured to the lower end of said soil amendment conduit comprisng two plates pivotably secured to the soil amendment conduit to close the lower end of said conduit,
means for synchronously actuating said valve means by said seed dispensing means to open at equal intervals therewith,
said seed conduit openly extending from said seed container to the plates to deliver seed independently thereto,
and means responsive to the valve actuating means for pivoting the plates to an open position.

References Cited

UNITED STATES PATENTS

| 1,011,205 | 12/1911 | Johnson | 111—51 |
| 1,625,390 | 4/1927 | Ray | 111—51 |
| 1,993,649 | 3/1935 | Crutcher | 111—73 |
| 2,525,435 | 10/1950 | White | 111—39 |

ROBERT E. PULFREY, Primary Examiner

S. C. PELLEGRINO, Assistant Examiner

U.S. Cl. X.R.

111—37, 80, 87